US011164036B2

(12) United States Patent
Irving et al.

(10) Patent No.: US 11,164,036 B2
(45) Date of Patent: Nov. 2, 2021

(54) HUMAN-ASSISTED MACHINE LEARNING THROUGH GEOMETRIC MANIPULATION AND REFINEMENT

(71) Applicant: The Government of the United States of America, as represented by the Secretary of the Navy, Arlington, VA (US)

(72) Inventors: Samuel Irving, Baton Rouge, LA (US); Christopher J. Michael, Mandeville, LA (US); Meg Palmsten, Pass Christian, MS (US); Steven Dennis, Covington, LA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/557,386

(22) Filed: Aug. 30, 2019

(65) Prior Publication Data

US 2020/0160098 A1    May 21, 2020

Related U.S. Application Data

(60) Provisional application No. 62/725,062, filed on Aug. 30, 2018.

(51) Int. Cl.
*G06K 9/62* (2006.01)
*G06K 9/46* (2006.01)

(52) U.S. Cl.
CPC ......... *G06K 9/6212* (2013.01); *G06K 9/4642* (2013.01); *G06K 9/4652* (2013.01); *G06K 9/6217* (2013.01); *G06K 2009/6213* (2013.01)

(58) Field of Classification Search
None
See application file for complete search history.

(56) References Cited

U.S. PATENT DOCUMENTS

| | | | | |
|---|---|---|---|---|
| 9,342,881 B1* | 5/2016 | Peleg | ................... | G06T 7/0012 |
| 10,650,278 B1* | 5/2020 | Ho | ................... | G06K 9/00201 |
| 2003/0012428 A1* | 1/2003 | Syeda-Mahmood | ................... | |
| | | | | G06F 16/5838 |
| | | | | 382/162 |
| 2010/0145931 A1* | 6/2010 | Chang | ................... | G06F 16/29 |
| | | | | 707/715 |

(Continued)

OTHER PUBLICATIONS

Piance, C., R. Holman, and E. Siegle (2015), Shoreline variability from days to decades: Results of long-term video imaging, J. Geophys. Res. Oceans, 120, 2159-217.

(Continued)

*Primary Examiner* — Edward Park
(74) *Attorney, Agent, or Firm* — US Naval Research Laboratory; William P. Ladd

(57) ABSTRACT

Systems and methods are provided for feature detection such that users can apply advanced machine learning and artificial intelligence (AI) without the need for a deep understanding of existing algorithms and techniques. Embodiments of the present disclosure provide systems and methods than enable easy access to a suite of machine learning algorithms and techniques, an intuitive interface for training an AI to recognize image features based on geometric "correct and refine" recursion, and real-time visualizations of training effectiveness.

20 Claims, 7 Drawing Sheets

(56) References Cited

U.S. PATENT DOCUMENTS

| | | | | |
|---|---|---|---|---|
| 2013/0129233 A1* | 5/2013 | Schiller | ............... | G06T 11/60 |
| | | | | 382/228 |
| 2014/0010464 A1* | 1/2014 | Umeda | ............... | G06T 11/60 |
| | | | | 382/224 |
| 2018/0181885 A1* | 6/2018 | Higo | ............... | G06F 40/279 |
| 2018/0322367 A1* | 11/2018 | Chang | ............... | G06K 9/4604 |
| 2020/0160098 A1* | 5/2020 | Irving | ............... | G06K 9/4642 |

OTHER PUBLICATIONS

Madsen, A. J., and N. G. Plant (2001), Intertidal beach slope predictions compared to field data, Mar. Geol., 173, 121-139.

Abdelsamea, Mohammed M., Giorgio Gnecco, and Mohamed Medhat Gaber. "An efficient self-organizing active contour model for image segmentation." Neurocomputing 149 (2015): 820-835.

K.P Ngoi, J.C Jia, An active contour model for colour region extraction in natural scenes, In Image and Vision Computing, vol. 17, Issue 13, 1999, pp. 955-966, ISSN 0262-8856.

B.M. Hoonhout, M. Radermacher, F. Baart, L.J.P. van der Maaten, An automated method for semantic classification of regions in coastal images, In Coastal Engineering, vol. 105, 2015, pp. 1-2, ISSN 0378-3839, https://doi.org/10.1016/j.coastaleng.2015.07.010.

International Search Report for PCT/US2019/049149 from the International Searching Authority, dated Jan. 2, 2020.

Written Opinion for PCT/US2019/049149 from the International Searching Authority, dated Jan. 2, 2020.

International Preliminary Report on Patentability for PCT/US2019/049149 from the International Searching Authority, dated Mar. 2, 2021.

* cited by examiner

| Properties (Prefix) | Extending Functional | Extending Perpendicular | Radial | Perpendicular |
|---|---|---|---|---|
| Geometry (Suffix) | Polyline | Polyline | Polygon | Polygon |
| Acronym | EFPL | EPPL | RPG | PPG |
| Constants | Normal $\alpha$ | N/A | Pole O | N/A |
| $\alpha_i$ Update? | No | Yes | No | Yes |
| Shape Example | (503) | (505) | (507) | (509) |

Vertex normal angle

HUMAN-ASSISTED MACHINE LEARNING THROUGH GEOMETRIC MANIPULATION AND REFINEMENT

CROSS REFERENCE TO RELATED APPLICATIONS

This application claims the benefit of U.S. Provisional Patent Application No. 62/725,062, filed on Aug. 30, 2018, which is incorporated by reference herein in its entirety.

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, D.C. 20375, USA; +1.202.767.7230; techtran@nrl.navy.mil, referencing Navy Case Number 106039-US2.

FIELD OF THE DISCLOSURE

This disclosure relates to machine learning, including machine learning for digital images.

BACKGROUND

Many scientists conduct research that requires repeatedly finding regions, objects, or persons of interest in images or video, often millions of times. Examples include detection of roads or shorelines in aerial photographs, detection of ocean currents in videos, or detection of wave breaking in a time exposure image. Machine-learning techniques can be used to convert images or video into a set of geometric labels describing image characteristics. This process is prohibitive to users unfamiliar with existing techniques and time consuming, and reasons for poor performance are often unintuitive and difficult to diagnose due to a lack of visualization tools.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings:

FIG. 5 is a diagram illustrating exemplary methods that an image classifier device in accordance with an embodiment of the present disclosure can use to calculate a search space;

Figure 1:
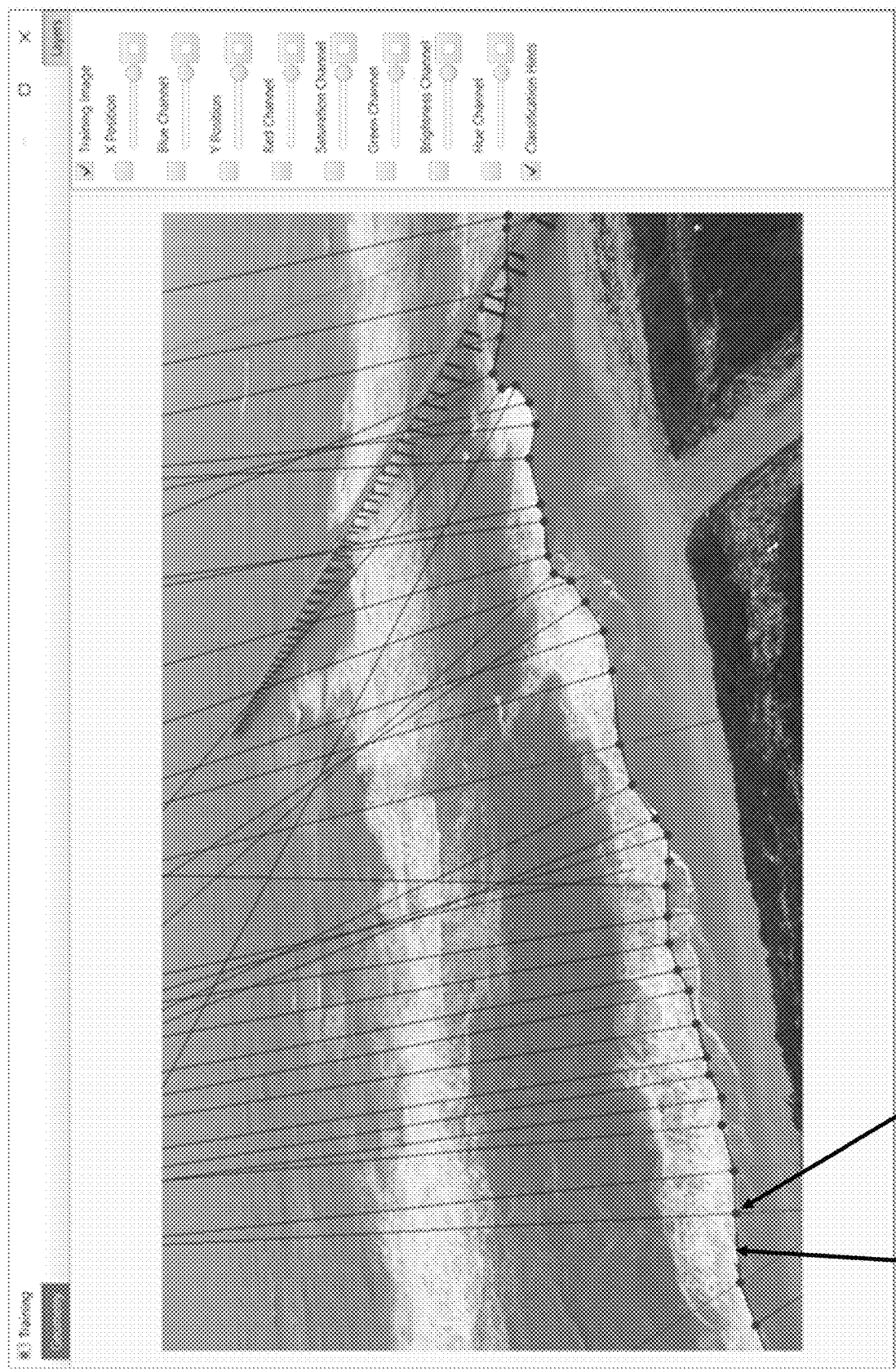
FIG. 1 illustrates an example of training an image classifier in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. OVERVIEW

Embodiments of the present disclosure provide systems and methods for feature detection enabling users to apply advanced machine learning and artificial intelligence (AI) without the need for a deep understanding of existing algorithms and techniques. Embodiments of the present disclosure provide systems and methods than enable easy access to a suite of machine learning algorithms and techniques, an intuitive interface for training an AI to recognize image features based on geometric "correct and refine" recursion, and real-time visualizations of training effectiveness.

Embodiments of the present disclosure facilitate the use of computer vision techniques to acquire, process, analyze, and understand digital images. Using input imagery, embodiments of the present disclosure can provide (1) an image classifier and configuration tailored to the user's specific task; (2) an executable file that can automatically label image features (i.e., draw geometry around regions of interest, highlight human faces, find empty parking spots, etc.); a component ready to be used in other applications; (3)

a set of labeled training examples, which can be used to train other image classifiers; (4) a recursive training system that allows human intervention to correct a manageable of feature geometries; (5) a history of human corrections made during training; and (6) a session-configuration file allowing the training data, algorithm, configuration, etc. to be reloaded and modified in the future.

2. USING MACHINE LEARNING FOR DETECTING GEOSPATIAL FEATURES

Machine-learning techniques can be used to convert images or video into a set of geometric labels describing image characteristics. This process is prohibitive to users unfamiliar with existing techniques and time consuming, and reasons for poor performance are often unintuitive and difficult to diagnose due to a lack of visualization tools. For example, one method for creating a feature detector using machine learning requires a series of heuristic loops ending once the classifier has achieved sufficient accuracy.

An exemplary machine learning process involves building a training set by creating a set of human-labeled examples to train the classifier. Typically, this is an image set and an accompanying text file identifying the image contents. This training set is created by hand, which can be very time consuming, especially if the data set is large or if the labels are intricate. The minimum training-set size is unknown and heuristically determined. Next, an implementation of a machine-learning algorithm is found or created. Typically, many algorithms are tested as the optimal algorithm depends on the application, with huge differences in training time and performance. The machine-learning algorithm parameters are then tailored to the specific application. Parameter configuration is initially unknown and must be determined heuristically. The classifier is then trained for a set period or number of iterations. The ideal length of the training is unknown and is typically determined heuristically. The classifier is tested for accuracy using human-labeled examples that were withheld during training. Algorithm performance is quantified during the validation process. The variables are updated after validation, requiring re-running all successive stages. For example, reconfiguring the algorithm requires re-training and reevaluating accuracy. Each of the stages listed above requires optimization, potentially requiring numerous iterations. Presently, an expert user must develop a bespoke feature detection system.

As discussed above, this process can be unintuitive, time consuming, and inefficient. Embodiments of the present disclosure provide systems and methods for human-assisted machine learning (HAML) enabling users to apply advanced machine learning and artificial intelligence (AI) without the need for a deep understanding of existing algorithms and techniques.

3. EXEMPLARY HUMAN-ASSISTED MACHINE LEARNING (HAML) SYSTEM

In an embodiment, a HAML system can be implemented using computer software comprising source files, including source files for: (1) a Graphical User Interface (GUI) for managing files, visualizing detected features, correcting miss-classifications, and configuring machine learning parameters; (2) machine learning algorithms and data structures for storing human corrections, training data, and session configurations; and (3) interfaces for external machine learning libraries.

In an embodiment, when the application is launched, a window pops up including a "File" menu button, a "Window" menu button, and an empty log file. In an embodiment, the "File" menu button is used to declare the storage location of the current session, save a file, or to re-open an existing file. In an embodiment, the "Window" menu button opens a "Training" and "Testing" window. In an embodiment, the Log file will be populated with details about the user's actions, including performance statistics and errors.

In and embodiment, in a new session, a user can first choose "Window">"Testing" to select a directory of images for building an image classifier. The user can then select the "Set Path" button from the "Data" menu and choose an image directory for training. In an embodiment, when the directory is set, the "Testing" window will be redrawn with the images contained in the Testing directory, giving the user access to image analysis tools. In an embodiment, the number of images displayed on screen can be changed by selecting a configuration (e.g., a 2×2, 3×3, 4×4, etc. configuration of images).

In an embodiment, a user can designate images to add the images to a "training set" for the image classifier (e.g., in an embodiment, by clicking the "X" in the top left of each testing image). In an embodiment, these images can be used to indicate that the current image classifier failed to correctly label one or more images. In an embodiment, the user can create a new image classifier and begin training using the selected images (e.g., by opening the "Training" window and choosing "Edit">"Create Region"). In an embodiment, the user can specify the name of the region to be labeled and a designator (e.g., in an embodiment, a color) to use for visualization. For example, in an embodiment, a user can name a region "foliage" and select a green color for the "vegetation" region for labeling. Other examples for labeling include, but are not limited to, "sand," "sky," building," etc.

In an embodiment, after creating a new region, the training example(s) can be labeled using an untrained classifier, which usually produces inaccurate results. In an embodiment, a default classifier identifies classes in the default region (e.g., using pixels, polylines, polygons, etc.). In an embodiment, the default classifier uses a horizontal "guide line" and a simple color similarity classifier to identify classes in the default region. In an embodiment, the guide line has a default position of 0, using the top row of pixels as a training example (e.g., for "vegetation").

In an embodiment, the stages of the region classifier are shown in a toolbar on left after the user has created a new region, and these stages depend on the user-defined training algorithm and geometry (such as a horizontal polyline). The user can train the classifier to improve performance. For example, in an embodiment, the user can use a training tool, such as a "Guide Line" tool. In an embodiment, the "Guide Line" tool can implement "correct and refine" recursion, which allows a human user to intuitively correct the classifier's mistakes within a manageable set of possible corrections. For example, in an embodiment, the user can be offered a plurality of vertices of a polyline generated by the classifier to correct. The classification can be refined by retraining the classifier with the corresponding corrections and re-classifying the training result. In an embodiment, the user can then be given another manageable set of vertices and can give another set of corrections to the classifier. This process can repeat (e.g., as many times as desired by the user) until the recursion converges on a pixel-by-pixel correction if necessary. In an embodiment, the classifier can also provide confidence levels after classifying an image (e.g., in an embodiment, based on prior experience classifying similar images).

FIG. 1 illustrates an example of training an image classifier in accordance with an embodiment of the present disclosure. In FIG. 1, an image of a beach is provided. The user can train the image classifier to recognize the shoreline. For example, the image classifier can first generate a default classification for the shoreline (e.g., based on prior experience classifying shorelines and/or by detecting color and geometry differences in the image). In FIG. 1, the image classifier classifies the shoreline by generating a polyline 102 comprising a plurality of vertices (e.g., such as vertex 104). In an embodiment, to improve the classifier, the user can alter the position of the vertices (e.g., by dragging them) to alter the polyline. The user can then submit the corrected image to the classifier for training. Using the corrections, the image classifier can generate a new classification, and the user can resubmit modifications if necessary. In an embodiment, these modifications can help the image classifier to better classify similar images in the future (e.g., similar locations of shorelines in images).

The image classifier can also be trained to recognize other features in the image of FIG. 1, such as vegetation. For example, in an embodiment, the image classifier can designate pixels of the image of FIG. 1 as vegetation and receive corrections from the user. In an embodiment, the image classifier can draw one or more polylines (and/or polygons) around one or more sections of vegetation in FIG. 1 and can receive corrections from the user to enable the image classifier to better detect locations of vegetation in similar images in the future.

Figure 2:
FIG. 2 illustrates an example of training an image classifier in accordance with an embodiment of the present disclosure.

FIG. 2 illustrates an example of training an image classifier in accordance with an embodiment of the present disclosure. For example, in FIG. 2, the image classifier is asked to classify the sky in the image of FIG. 2. In an embodiment, a user can add vertices to a polyline generated by the image classifier to improve classification. For example, to improve the classification of FIG. 2, a user may want to add one or more vertices between vertex 202 and vertex 204 of the polyline to better generate a polyline around the sky in the image of FIG. 2.

In an embodiment, an image classifier can be configured to constrain movement of vertices to reduce compression while maximizing the effectiveness of the training data. For example, in an embodiment, vertices 202 and 204 can be designated as "locked" vertices, a new vertex can be added by the user between vertices 202 and 204. In an embodiment, the movement of the new vertex between vertices 202 and 204 can be constrained such that the new position of the vertex must be within a predetermined range of the original location of the vertex on the polyline.

In an embodiment, the image classifier uses implicit polygons having geometries derived from properties of features. For example, in an embodiment, the image classifier can use extending functional polylines and extending balloon polylines. In an embodiment, an extending functional polyline is a polyline whose endpoints extend to image borders, where each vertex's search space is restricted to lines in the direction of some predefined angle. In an embodiment, this geometry represents a functional curve and is the most constrained implicit polygon (therefore requiring the least amount of refinement). For example, in FIG. 1, if extending functional polylines are used, the search space for locations of vertices along polyline 102 are restricted to lines in the direction of predefined angles. In an embodiment, for extending balloon polylines, search spaces for vertices are restricted to the line orthogonal to their current location. For example, in FIG. 1, if extending balloon polylines are used, the search space for locations of vertices along polyline 102 are restricted to lines orthogonal to the current location of vertices.

4. EXEMPLARY METHODS

Figure 3:
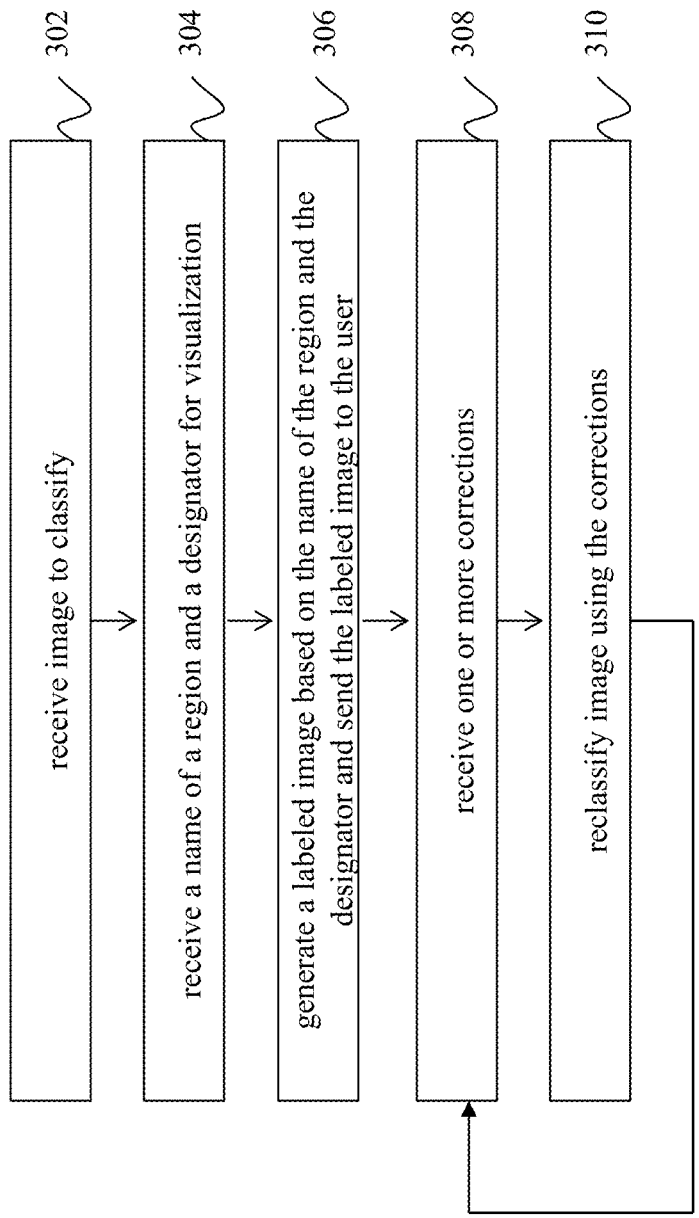
FIG. 3 is a flowchart of a method for classifying and image in accordance with an embodiment of the present disclosure.

FIG. 3 is a flowchart of a method for classifying and image in accordance with an embodiment of the present disclosure. In step 302, an image to classify is received. For example, in an embodiment, a user can select a folder of images and designate one or more of the images for training. In step 304, a name of a region and a designator for visualization are received. For example, in an embodiment, a user can designate "vegetation" as a region to be classified and a green polyline to be used for designating the vegetation in the image. In step 306, a labeled image is generated based on name of the region and designator from the user, and the labeled image is sent to the user. For example, in an embodiment, the image classifier can generate a default classification for the vegetation in the image (e.g., using a default algorithm and/or based on prior experience classifying vegetation in similar images) based on the input from the user, and the image classifier can then send the labeled image to the user. In step 308, one or more corrections are received. For example, in an embodiment, if the classifier labeled vegetation in the image using a polyline, the user can alter the location of one or more vertices in the polyline and/or can add one or more vertices to the polyline. The user can then submit the modified image to the classifier. In step 310, the image is reclassified using the corrections. For example, in an embodiment, the classifier can use the user's modifications to improve classification of the image and can generate a new classification for the image based on the modifications. In an embodiment, steps 308 and 310 can be repeated until a satisfactory classification has been achieved.

5. EXEMPLARY SYSTEMS

Figure 4:
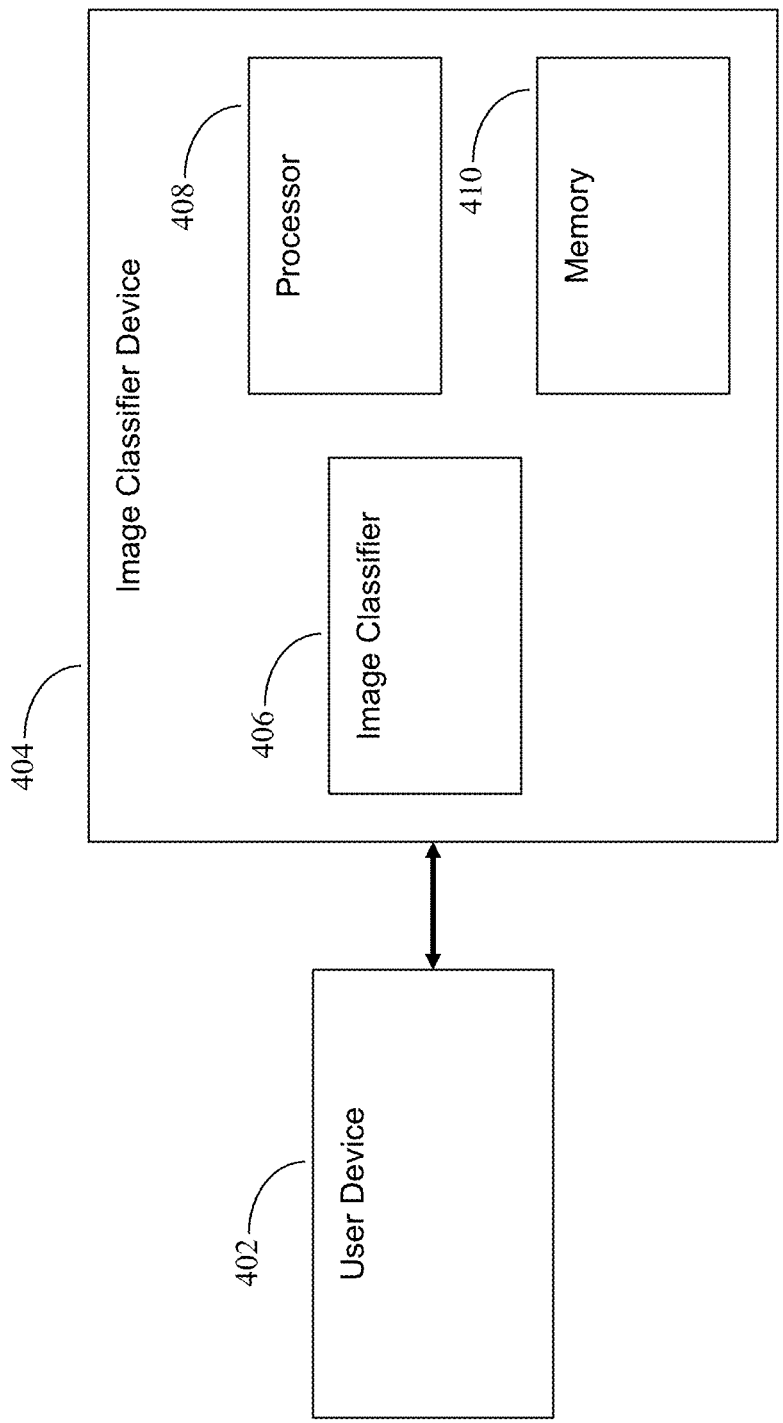
FIG. 4 is a diagram of an exemplary image classifier system in accordance with an embodiment of the present disclosure.

FIG. 4 is a diagram of an exemplary image classifier system in accordance with an embodiment of the present disclosure. In FIG. 4, the image classifier system includes a user device 402 and an image classifier device 404. In an embodiment, user device 402 can be any device a human user can use to send and receive input, such as a personal computer, a mobile phone, a special purpose device, a keyboard, etc.

In FIG. 4, user device 402 communicates with image classifier device 404, which includes an image classifier 406, a processor 408, and a memory 410. For example, in an embodiment, user device 402 can send an image to be classified to image classifier device 404, along with a name of a region to be classified (e.g., "vegetation") and a designator for visualization (e.g., a green polyline). In an embodiment, image classifier device 404 can label the image (e.g., using a default classifier) and can send the classified image to user device 402. In an embodiment, a user can use user device 402 to correct the classifications (e.g., by moving and/or adding vertices to polyline) and can send the corrected image to image classifier device 404. In an embodiment, image classifier device 404 can receive the corrected image, reclassify the image, and send the reclassified image back to user device 402. User device 402 and image classifier device 404 can communicate in this way until the image has been adequately classified (e.g., until the user is satisfied with the classification of the image).

Image classifier device 406 can be implemented using hardware, software, and/or a combination of hardware and software. Image classifier device 404 and image classifier 406 can be implemented using a single device or multiple devices. Image classifier device 404 can be implemented as a standalone device (e.g., as a standalone special purpose device) or integrated into a host device (e.g., into a general purpose computer or a special purpose computer). In an embodiment, image classifier device 404 is implemented on a server remote to user device 402, and user device 402 communicates with image classifier device 404 using a client, application, or webpage. In an embodiment, image classifier 406 is installed on user device 402 and uses a processor and memory on user device 402. In an embodiment, image classifier device 404 is a device implemented as part of user device 402.

6. CALCULATING SEARCH SPACE

In an embodiment, image classifier device 406 can determine how to select vertices for a polyline or polygon by calculating uncertainty for each point along a polyline or polygon. In an embodiment, to make this uncertainty calculation, image classifier device 406 can determine a search space for each point along the polyline or polygon. FIG. 5 is a diagram illustrating exemplary methods that an image classifier device 406 in accordance with an embodiment of the present disclosure can use to calculate a search space.

In an embodiment using an extending functional method 502 for calculating a search space for a polyline, a user can define an angle α, and the search space for each point on the polyline will include points on a line drawn α degrees away from the polyline, as shown in image 503.

In an embodiment using an extending perpendicular method 504 for calculating a search space for a polyline, instead of using a user defined angle α, the search space for each point on the polyline will include points on a line drawn orthogonal to the polyline at each point on the polyline, as shown by image 505.

In an embodiment using a radial method 506 for calculating a search space for a polygon, a pole O (i.e., a center point) of a polygon can be determined by a user or by an algorithm. The search space will include points on lines drawn away from pole O, as shown in image 507. For example, in an embodiment, a search space for a point along the polygon comprises a line drawn from the pole O to the point.

In an embodiment using a perpendicular method 508 for calculating a search space for a polygon, the search space for each point along the edges polygon will include points on a line drawn orthogonal to the polygon at each point on the polygon, as shown by image 509.

7. CALCULATING UNCERTAINTY

Figure 6:
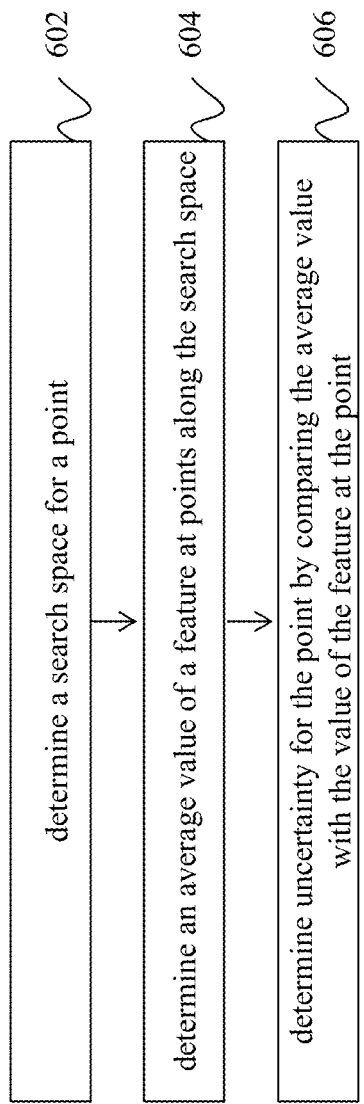
FIG. 6 is a flowchart for an exemplary method for calculating uncertainty for a point along a polyline or polygon in accordance with an embodiment of the present disclosure.

In an embodiment, image classifier device 406 can determine how to select vertices for a polyline or polygon by calculating uncertainty along the search space for each point along a polyline or polygon based on pixels with similar features (e.g., color, texture, latitude, longitude, etc.) that correspond to vertices that were previously moved by a user. For example, in an embodiment, if a user moves vertex 104 in FIG. 1, thereby creating a modified polyline for a shoreline, image classifier device 406 can designate an area below the modified polyline as "shoreline" and an area above the modified polyline as "not shoreline." In an embodiment, image classifier device 406 can calculate uncertainty for a point along polyline 102 by determining, for each point along the search space for the point along polyline 102, how similar the features (e.g., color, texture, latitude, longitude, etc.) of points along the search space are to the features of the point along the polyline. For example, in an embodiment, image classifier device 406 can calculate uncertainty for a point along polyline 102 by determining how similar the features of pixels along the search space are to the features of the pixel at the point along the polyline FIG. 6 is a flowchart for an exemplary method for calculating uncertainty for a point along a polyline or polygon in accordance with an embodiment of the present disclosure. In step 602, a search space for a point is determined. For example, in an embodiment, a search space can be determined based on the methods shown in FIG. 5. In an embodiment, a user selects which method to use for determining the search space. In step 604, an average value of a feature (e.g., color, texture, latitude, longitude, etc.) at points along the search space is determined. In step 606, uncertainty for the point is determined comparing the average value with the value of the feature at the point. For example, in an embodiment, image classifier device 406 can determine uncertainty for vertex 104 by calculating the average color of pixels along the search space for vertex 104 and comparing this average value with the color of the pixel at vertex 104. This comparison can be made for a single feature or for all known features in accordance with embodiments of the present disclosure. In an embodiment, the method of FIG. 6 can be performed for all points along a polyline or polygon to determine uncertainty for all points along the polyline or polygon.

In an embodiment, vertices for a new polyline or polygon to be generated can be selected based on the calculated uncertainties. In an embodiment, points with the most uncertainty are selected as vertices (e.g., so that more information can be obtained from the user). In an embodiment, points with the least uncertainty are selected as vertices (e.g., to enable image classifier device 406 to make a more certain polyline or polygon). In an embodiment, a number of vertices to be selected can be determined based on how much information image classifier device 406 has about the image. For example, image classifier device 406 can determine that more vertices should be selected as image classifier device 406 receives more user feedback and/or if image classifier device 406 determines that an image to be classified is sufficiently similar to a previously classified image. For example, in an embodiment, image classifier device 406 can determine the number of vertices to be selected based on a number of vertices that were moved and/or created by a user in a correction. In an embodiment, once image classifier device 406 has determined a number of vertices for a new polyline or polygon and locations for the new vertices, image classifier device 406 can draw a new polyline or polygon using the new vertices and can send the new polyline or polygon to user device 402.

Figure 7:
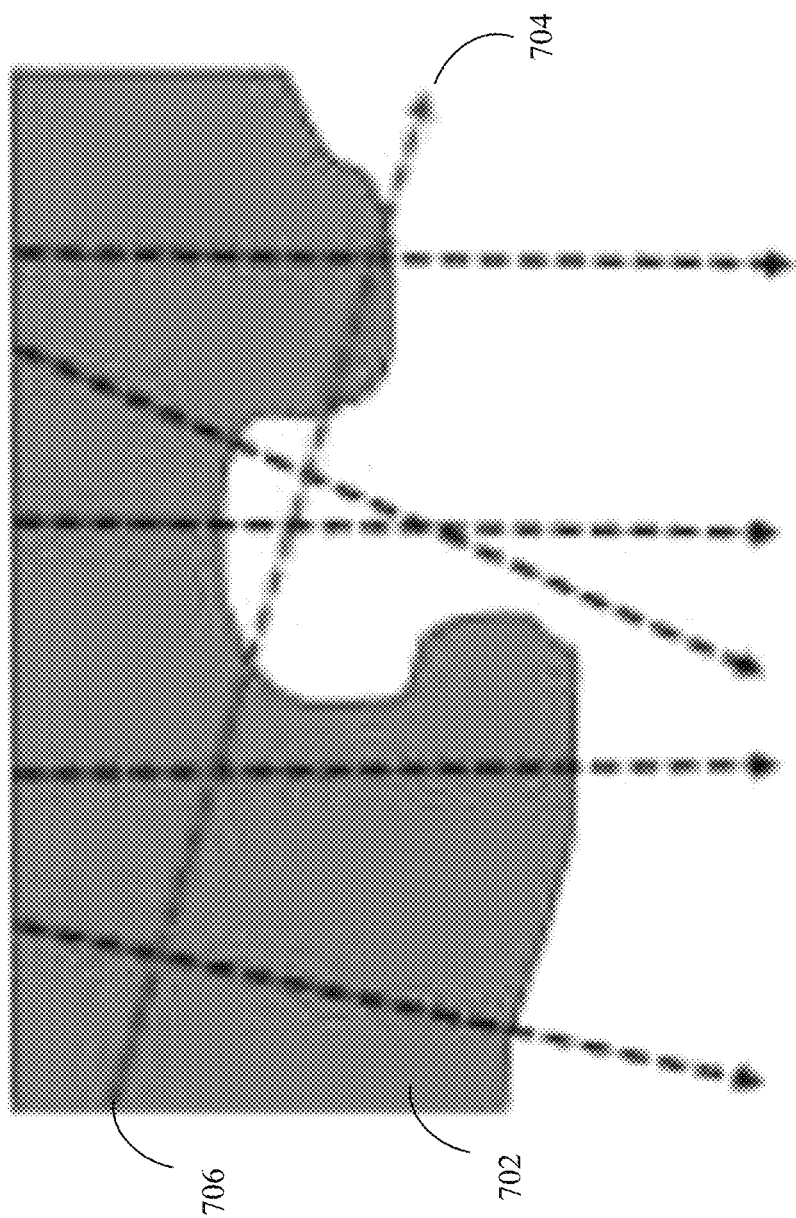
FIG. 7 is an image showing an increased uncertainty for a point due to the path of its search space in accordance with an embodiment of the present disclosure.

In an embodiment, uncertainty for a point can be increased if the search space for the point crosses through an area inside a region, over an area outside the region, and back into an area inside the region. For example, FIG. 7 is an image showing an increased uncertainty for a point due to the path of its search space in accordance with an embodiment of the present disclosure. In FIG. 7, the area inside polygon 702 can be designated as "water," and the area outside polygon 702 can be designated as "not water." In FIG. 7, the search space 704 for point 706 passes through the area designated as "water," over an area outside the area designated as "water," and back into the area designated as "water." In an embodiment, image classifier device 406 can detect that the search space for point 706 overlaps an area outside the region of interest and can increase the uncertainty for point 706 in response to this detection. In an embodiment, if the user places a vertex on point 706, image classifier device 406 can select fewer vertices for the next polyline or polygon to be generated.

8. EXEMPLARY ADVANTAGES

Embodiments of the present disclosure eliminate the need for users to understand machine learning algorithms by streamlining the configuration, training, and testing process. Embodiments of the present disclosure provide both an intuitive visualization of training accuracy and transferability as well as intuitive tools for correcting errors. Users have access to a wide variety of machine learning algorithms and techniques while learning to use a tool suitable for many image classification applications. Embodiments of the present disclosure also eliminate the need for additional tools by creating training sets, providing automatic visualization, and providing quick retraining with graphical user interface (GUI) inputs. By performing these functions, embodiments of the present disclosure can allow users to directly edit visualizations and create new training data, which can then be used to quickly retrain a new classifier.

9. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented using a computer program executing on a machine, a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A system for classifying an image, the system comprising:
   a user device; and
   an image classifier device in communication with the user device, wherein the image classifier device is configured to:
      receive the image from the user device,
      receive, from the user device, a name of a region in the image and a designator for visualization of the region,
      generate a first labeled image based on the name of the region and the designator, wherein the first labeled image comprises a first polyline,
      send the labeled image to the user device,
      receive a correction to the labeled image from the user device, wherein the correction comprises a location of a vertex in the first polyline,
      determine, based on the location of the vertex, a plurality of uncertainties for a plurality of points along the first polyline,
      determine a plurality of vertices based on the determined uncertainties,
      generate a second polyline based on the determined plurality of vertices, and
      generate a second labeled image, comprising the second polyline, based on the correction.

2. The system of claim 1, wherein the first labeled image comprises a first polygon, and wherein the correction comprises a location of a vertex in the first polygon.

3. The system of claim 1, wherein the image classifier device is further configured to:
   connect the determined plurality of vertices with respective lines, thereby generating the second polyline.

4. An image classifier, comprising:
   a processor; and a memory comprising instructions that, when executed by the processor, cause the processor to perform operations comprising:
receiving the image,
receiving, a name of a region in the image and a designator for visualization of the region,
generating a first labeled image based on the name of the region and the designator, wherein the first labeled image comprises a first polyline,
transmitting the labeled image,
receiving a correction to the labeled image, wherein the correction comprises a location of a vertex in the first polyline,
determining, based on the location of the vertex, a plurality of uncertainties for a plurality of points along the first polyline,
determining a plurality of vertices based on the determined uncertainties,
generating a second polyline based on the determined plurality of vertices, and
generating a second labeled image, comprising the second polyline, based on the correction.

5. The image classifier of claim 4, wherein the operations further comprise:
connecting the determined plurality of vertices with respective lines, thereby generating the second polyline.

6. A method for classifying an image, the method comprising:
receiving the image from a user device;
receiving, from the user device, a name of a region in the image and a designator for visualization of the region;
generating a first labeled image based on the name of the region and the designator, wherein the first labeled image comprises a first polyline;
sending the labeled image to the user device;
receiving a correction to the labeled image from the user device, wherein the correction comprises a location of a vertex in the first polyline;
generating a second polyline, wherein generating the second polyline comprises:
determining, based on the location of the vertex, a plurality of uncertainties for a plurality of points along the first polyline,
determining a plurality of vertices based on the determined uncertainties, and
generating the second polyline based on the determined plurality of vertices; and
generating a second labeled image comprising the second polyline.

7. The method of claim 6, wherein determining an uncertainty for a first point in the plurality of points comprises:
determining a search space for the first point;
determining an average value of a feature at points along the search space; and
determining the uncertainty for the first point by comparing the determined average value with a value of the feature at the first point.

8. The method of claim 7, wherein the search space comprises a second plurality of points along a line drawn at an angle from the first point.

9. The method of claim 8, wherein determining the search space further comprises:
determining the angle for the line based on input from a user, wherein corresponding search spaces for each point in the plurality of points comprise corresponding points along corresponding lines drawn at the angle from each point in the plurality of points.

10. The method of claim 7, wherein determining the search space further comprises:
determining a line that is orthogonal to the first polyline at the first point, wherein the search space comprises a second plurality of points along the line.

11. The method of claim 7, wherein the first polyline encloses a first polygon.

12. The method of claim 11, wherein determining an uncertainty for a first point in the plurality of points comprises:
determining a location of an interior point inside the first polygon, wherein the search space comprises a second plurality of points along a line drawn from the interior point to the first point.

13. The method of claim 12, wherein determining the location of the interior point comprises:
determining a location in the middle of the first polygon as the interior point.

14. The method of claim 7, wherein the first polyline encloses a first polygon, and wherein determining an uncertainty for a first point in the plurality of points comprises:
determining a line that is orthogonal to the first polyline at the first point, wherein the search space comprises a second plurality of points along the line.

15. The method of claim 7, wherein determining an average value of a feature at points along the search space comprises determining an average color at pixels in the image, wherein respective locations of the pixels in the image correspond to respective locations of points along the search space.

16. The method of claim 7, further comprising:
determining whether the search space for the first point overlaps an area outside the region.

17. The method of claim 16, further comprising:
increasing the uncertainty for the first point in response to determining that the search space for the first point overlaps the area outside the region.

18. The method of claim 6, wherein generating the second polyline based on the determined plurality of vertices comprises:
selecting a plurality of points along the first polyline having the highest uncertainties in the plurality of uncertainties as the determined plurality of vertices.

19. The method of claim 6, wherein generating the second polyline based on the determined plurality of vertices comprises:
selecting a plurality of points along the first polyline having the lowest uncertainties in the plurality of uncertainties as the determined plurality of vertices.

20. The method of claim 6, wherein determining the plurality of vertices further comprises:
determining a number of vertices in the plurality of vertices based on a number of locations of vertices in the first polyline in the correction.

* * * * *